United States Patent
Bar-Shalom et al.

(10) Patent No.: US 12,235,386 B2
(45) Date of Patent: Feb. 25, 2025

(54) SYSTEM AND METHOD FOR DYNAMIC CALIBRATION OF RADAR

(71) Applicant: GM GLOBAL TECHNOLOGY OPERATIONS LLC, Detroit, MI (US)

(72) Inventors: Ofer Bar-Shalom, Kiryat Ono (IL); Igal Kotzer, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 437 days.

(21) Appl. No.: 17/730,497

(22) Filed: Apr. 27, 2022

(65) Prior Publication Data
US 2023/0350014 A1 Nov. 2, 2023

(51) Int. Cl.
| | |
|---|---|
| *G01S 7/40* | (2006.01) |
| *B60W 10/00* | (2006.01) |
| *G01S 13/931* | (2020.01) |
| *H01Q 3/26* | (2006.01) |

(52) U.S. Cl.
CPC .............. *G01S 7/40* (2013.01); *G01S 13/931* (2013.01); *H01Q 3/267* (2013.01); *B60W 10/00* (2013.01); *B60W 2420/408* (2024.01)

(58) Field of Classification Search
CPC ... G01S 13/931; G01S 7/40; G01S 2013/0245
USPC ............................ 342/174, 165, 173, 368, 81
See application file for complete search history.

(56) References Cited

U.S. PATENT DOCUMENTS

| | | | | |
|---|---|---|---|---|
| 7,205,936 | B2* | 4/2007 | Park | H01Q 3/267 |
| | | | | 342/368 |
| 9,035,828 | B2* | 5/2015 | O'Keeffe | H04B 17/20 |
| | | | | 342/368 |
| 11,054,499 | B2* | 7/2021 | Murali | G01S 13/931 |
| 11,156,696 | B2* | 10/2021 | Kitamura | G01S 7/032 |
| 11,815,621 | B2* | 11/2023 | Murali | G01S 7/4021 |
| 11,982,732 | B2* | 5/2024 | Choi | G01S 13/4418 |
| 2005/0140546 | A1* | 6/2005 | Park | G01S 7/4008 |
| | | | | 342/368 |

(Continued)

OTHER PUBLICATIONS

David C. Rife and Robert R. Boorstyne, "Single-Tone Parameter Estimation from Discrete-Time Observations", IEEE Transactions on Information Theory, vol. IT-20, No. 5, Sep. 1974, pp. 591-598.

(Continued)

*Primary Examiner* — Vladimir Magloire
*Assistant Examiner* — Michael W Justice
(74) *Attorney, Agent, or Firm* — Quinn IP Law (57) ABSTRACT

A system and associated method for calibrating a radar system is described, wherein the radar system includes a phased array antenna including a first antenna array and a second antenna array, a transmitter array, and a receiver array, communication leads, a calibration circuit, and a controller. The calibration circuit includes a power divider and directional couplers. A pilot signal is injected, via the power divider and the directional couplers, to the receivers during a quiet period. Phase offsets and gain imbalances for the receivers are determined in relation to a reference channel based upon the pilot signal, and phase calibrations and gain calibrations for the receivers are determined based upon the phase offsets and the gain imbalances, and a radar-related parameter is based upon the phase calibrations and the gain calibrations for the receivers.

20 Claims, 4 Drawing Sheets

(56) References Cited

U.S. PATENT DOCUMENTS

| | | | |
|---|---|---|---|
| 2012/0027066 A1* | 2/2012 | O'Keeffe | H01Q 1/246 |
| | | | 375/224 |
| 2017/0212214 A1* | 7/2017 | Murali | G01S 7/4021 |
| 2020/0355789 A1* | 11/2020 | Kitamura | G01S 13/584 |
| 2021/0063534 A1* | 3/2021 | Shams | G01S 7/4052 |
| 2021/0333357 A1* | 10/2021 | Murali | G01S 7/352 |
| 2021/0382165 A1* | 12/2021 | Choi | G01S 3/023 |

OTHER PUBLICATIONS

Steven Kay, "A Fast and Accurate Single Frequency Estimator", IEEE Transactions on Acoustics, Speech, and Signal Processing, vol. ASSP-37, No. 12, Dec. 1989, pp. 1987-1990.

* cited by examiner

SYSTEM AND METHOD FOR DYNAMIC CALIBRATION OF RADAR

INTRODUCTION

On-vehicle radar systems may be employed to detect and locate other vehicles, pedestrians and fixed or moving objects when deployed on ground vehicles.

Accurate calibration of phase, gain, frequency and related parameters is essential for applying array processing algorithms to estimate radar parameters such as directions of arrival, time delay, Doppler shift etc. Known methods for calibrating an antenna array require a dedicated setup that may include disconnecting or performing another intrusive action to the antennas to inject a calibration signal. Furthermore, automotive radar systems may be calibrated only once during vehicle production. However, during normal system operation, radar systems installed at different locations on a vehicle may experience different ambient temperatures. For example, one portion of a radar system may be facing the sun while another portion is in the shade, creating a temperature differential. In such scenarios temperature-attributed phase differences may be manifested and affect the overall radar performance.

SUMMARY

A system and method are described that enable dynamic in situ calibration of a radar system to accurately estimate radar parameters such as directions of arrival, time delay, Doppler shift etc., without disconnecting the antennas or undertaking another intrusive action.

A system and associated method for calibrating the radar system is described. The radar system includes a phased array antenna including a first antenna array and a second antenna array, a transmitter array, and a receiver array, a plurality of communication leads, a calibration circuit, and a controller. In one embodiment, the radar system may be arranged on a vehicle. The transmitter array is in communication with the first antenna array, and the receiver array is in communication with the second antenna array, with the receiver array including a plurality of receivers. The second antenna array includes a plurality of receive antennas, which communicate with the plurality of receivers via the plurality of communication leads. The calibration circuit includes a power divider and a plurality of directional couplers. The controller is arranged to communication with the transmitter array, the receiver array, and the calibration circuit. The controller includes an instruction set that is executable to inject, via the power divider and the plurality of directional couplers, a pilot signal to the plurality of receivers during a quiet period, designate one of the plurality of receivers as a reference channel, determine a plurality of phase offsets and a plurality of gain imbalances for the plurality of receivers in relation to the reference channel based upon the pilot signal, determine a plurality of phase calibrations and a plurality of gain calibrations for the plurality of receivers based upon the plurality of phase offsets and the plurality of gain imbalances and determine a radar-related parameter based upon the plurality of phase calibrations and the plurality of gain calibrations for the plurality of receivers. Operation of the radar system is controlled based upon the radar-related parameter.

An aspect of the disclosure includes the transmitter array being composed of a plurality of transmitters, and the first antenna array being composed of a plurality of transmit antennas.

Another aspect of the disclosure includes the transmitter array being composed of a single transmitter, and the first antenna array being composed of a single transmit antenna.

Another aspect of the disclosure includes the transmitter array being in communication with the first antenna array, and the receiver array being in communication with the second antenna array.

Another aspect of the disclosure includes the pilot signal being a short-term radiofrequency (RF) signal having a continuous sine wave.

Another aspect of the disclosure includes the pilot signal being injected between consecutive radar signals generated by the transmitter array.

Another aspect of the disclosure includes the radar system being configured as a frequency-modulated continuous-wave radar (FM-CW) system.

Another aspect of the disclosure includes the system to calibrate the radar system being arranged on a vehicle.

Another aspect of the disclosure includes the calibration circuit including the power divider and the plurality of directional couplers being arranged with each directional coupler including a first transmission link arranged proximal to a second transmission link, and the power divider including an input lead and a plurality of output leads. The input lead is connectable to an output of one of a plurality of transmitters of the transmitter array, each of the plurality of output leads of the power divider is connected to the first transmission link of the directional coupler, and each of the second transmission links of the plurality of directional couplers is connected in series between one of the plurality of receive antennas and one of the receivers of the receiver array.

Another aspect of the disclosure includes the instruction set being executable to determine one of a phase offset and a gain imbalance for each of the plurality of receivers.

Another aspect of the disclosure includes a method for calibrating a radar system that includes injecting, via a calibration circuit including a power divider and a plurality of directional couplers, a pilot signal to a plurality of receivers during a quiet period; designating one of the plurality of receivers as a reference channel, determining a plurality of phase offsets and a plurality of gain imbalances for the plurality of receivers in relation to the reference channel based upon the pilot signal, determining a plurality of phase calibrations and a plurality of gain calibrations for the plurality of receivers based upon the plurality of phase offsets and the plurality of gain imbalances, determining a radar-related parameter based upon the plurality of phase calibrations and the plurality of gain calibrations for the plurality of receivers, and controlling operation of the radar system based upon the radar-related parameter.

Another aspect of the disclosure includes a vehicle that includes a radar system, a radar calibration system, and an advanced driving assistance system (ADAS) configured to provide autonomous vehicle control. The radar system includes a phased array antenna including a first antenna array and a second antenna array, a transmitter array, and a receiver array, a plurality of communication leads, a calibration circuit, and a controller. The transmitter array is in communication with the first antenna array, the receiver array is in communication with the second antenna array, the receiver array includes a plurality of receivers. The second antenna array includes a plurality of receive antennas, the plurality of receive antennas communicates with the plurality of receivers via the plurality of communication leads, the calibration circuit includes a power divider and a plurality of directional couplers, and the radar calibration system includes a controller arranged to communication with the transmitter array, the receiver array, and the calibration circuit. The controller includes an instruction set that is executable to inject, via the power divider and the plurality of directional couplers, a pilot signal to the plurality of receivers during a quiet period, designate one of the plurality of receivers as a reference channel, determine a plurality of phase offsets and a plurality of gain imbalances for the plurality of receivers in relation to the reference channel based upon the pilot signal, determine a plurality of phase calibrations and a plurality of gain calibrations for the plurality of receivers based upon the plurality of phase offsets and the plurality of gain imbalances, determine a radar-related parameter based upon the plurality of phase calibrations and the plurality of gain calibrations for the plurality of receivers, and control operation of the radar system based upon the radar-related parameter.

Another aspect of the disclosure includes the ADAS being configured to provide autonomous vehicle control in response in the radar system that is calibrated via the calibration circuit.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
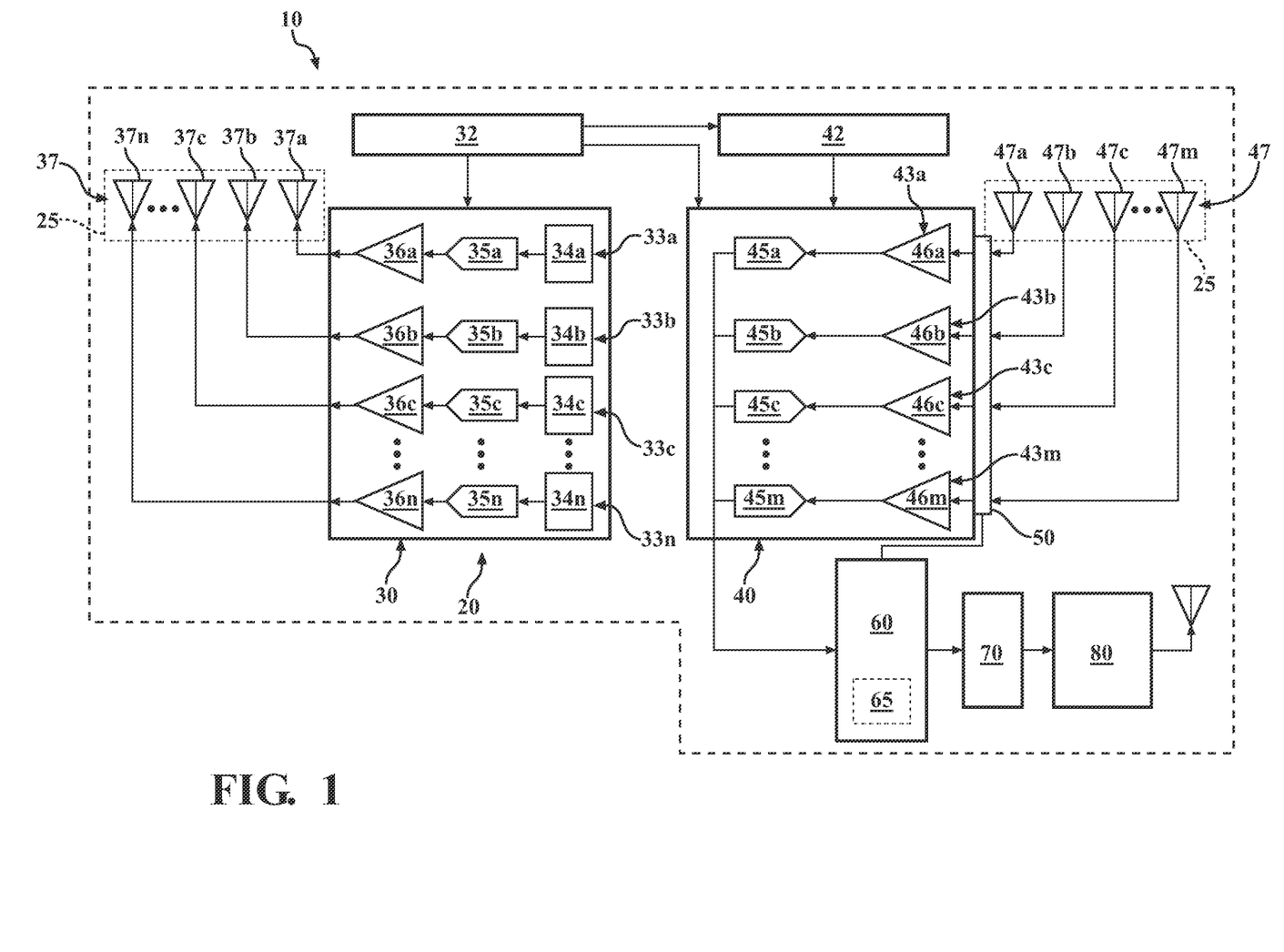
FIG. 1 schematically illustrates a radar system that includes a phased array antenna including a plurality of transmit antennas and a plurality of receive antennas, wherein the radar system is arranged on a vehicle, in accordance with the disclosure.

Referring to the drawings, wherein like reference numerals correspond to like or similar components, FIG. 1 consistent with embodiments disclosed herein, schematically illustrates elements of a vehicle 10 having a radar system 20 that includes a phased array antenna 25 including a calibration circuit 50 and a signal constructor controller 60. The vehicle 10 may include, but not be limited to a ground vehicle in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 10 may also include an advanced driving assistance system (ADAS) 70 that provides a level of autonomous vehicle control, and a telematics system 80. The on-vehicle radar system 20 provides information related to location and trajectory of vehicles, pedestrians and other objects proximal to the vehicle 10, with such information being communicated to the ADAS 70 for its use, which may include informing the operator and autonomously controlling the vehicle 10. The concepts described herein may be applied to numerous systems including vehicles and stationary devices, and are not limited to on-vehicle implementations.

As employed herein, the ADAS 70 includes an on-vehicle control system that is capable of providing a level of driving automation. The 'operator' describes the person responsible for directing operation of the vehicle 10, whether actively involved in controlling one or more vehicle functions or directing autonomous vehicle operation. Driving automation can include various dynamic driving and vehicle operations. Driving automation can include some level of automatic control or intervention related to a single vehicle function, such as steering, acceleration, and/or braking, with the operator continuously having overall control of the vehicle 10. Driving automation can include some level of automatic control or intervention related to simultaneous control of multiple vehicle functions, such as steering, acceleration, and/or braking, with the operator continuously having overall control of the vehicle. Driving automation can include simultaneous automatic control of vehicle driving functions, including steering, acceleration, and braking, wherein the operator cedes control of the vehicle 10 for a period of time during a trip. Driving automation can include simultaneous automatic control of vehicle driving functions, including steering, acceleration, and braking, wherein the operator cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like. The ADAS 70 preferably includes one or a plurality of vehicle systems and associated controllers that provide a level of driving automation. The vehicle systems, subsystems and controllers associated with the ADAS 70 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The telematics system 80 is an element of a wireless telematics communication system that is capable of extra-vehicle communication for communicating with a communication network system having wireless and wired communication capabilities. The extra-vehicle communication includes short-range vehicle-to-vehicle (V2V) communication and/or vehicle-to-everything (V2x) communication, which may include communication with an infrastructure monitor, e.g., a traffic camera, and communication to a proximal pedestrian, etc. Alternatively, or in addition, the wireless telematics communication system may be capable of short-range wireless communication to a handheld device, e.g., a cell phone, a satellite phone or another telephonic device. In one embodiment the handheld device is loaded with a software application that includes a wireless protocol to communicate with the telematics system 80, and the handheld device executes the extra-vehicle communication for communicating with an off-board controller via a communication network, which may be in the form of a satellite, a cell tower antenna, and/or another mode of communication.

The on-vehicle radar system 20 may be configured as a multiple input/multiple output (MIMO) system that includes the phased array antenna 25, a transmitter array 30, a receiver array 40, the calibration circuit 50, and the signal constructor controller 60. The elements of the on-vehicle radar system 20 may be configured to operate as a frequency-modulated continuous-wave radar (FM-CW) system, which is a non-linear-frequency-modulated (NLFM) system in one embodiment. The transmit frequency and related operating parameters for the NLFM system are selected to achieve desired values for range, range resolution, angular resolution, and velocity resolution for the expected operating environment of the vehicle 10. The NLFM system is arranged to generate and transmit tansec waveforms, which resolve beam skew error by compensating for additional phase variation beam skew error.

The phased array antenna 25 includes a first antenna array 37 including a plurality of transmit antennas 37a, 37b, 37c, . . . 37n, and a second antenna array 47 including a plurality of receiving antennas 47a, 47b, 47c, . . . 47m. As shown with reference to FIG. 2, the plurality of transmit antennas 37a, 37b, 37c, . . . 37n of the phased array antenna 25 are physically positioned with adjacent ones of the transmit antennas 37a, 37b, 37c, . . . 37n being separated by a predefined distance d.

The transmitter array 30 of the radar system 20 includes a quantity of n transmitters 33, which are designated by numerals 33a, 33b, 33c, . . . 33n. Each of the transmitters 33a, 33b, 33c, . . . 33n includes a respective signal generator 34a, 34b, 34c, . . . 34n that is in communication with a respective digital-to-analog converter (modulator) 35a, 35b, 35c, . . . 35n that is in communication with a respective power amplifier 36a, 36b, 36c, . . . 36n, which supplies a power signal to a respective one of the transmit antennas 37a, 37b, 37c, . . . 37n. The operation of the transmitters 33a, 33b, 33c, . . . 33n is controlled by a transmitter controller 32. In one embodiment, the signal generators 34a, 34b, 34c, . . . 34n are chirp digital direct synthesizer devices. The n transmitters 33 are disposed in a common location on the vehicle 10 in one embodiment.

The receiver array 40 includes a quantity of m receivers 43, which are designated by numerals 43a, 43b, 43c, . . . 43m. Each of the receivers 43a, 43b, 43c, . . . 43m includes a respective one of the receiving antennas 47a, 47b, 47c, . . . 47m that is in communication with a respective power amplifier 46a, 46b, 46c, . . . 46m that is in communication with a respective analog-to-digital converter 45a, 45b, 45c, . . . 45m. The operation of the receivers 43a, 43b, 43c, . . . 43m is controlled by a receiver controller 42. The m receivers 43 are disposed in a common location on the vehicle 10 in one embodiment. The m receivers 43 and the n transmitters 33 are disposed in a common location on the vehicle 10 in one embodiment.

The transmitter controller 32 communicates with each of the transmitters 33a, 33b, 33c, . . . 33n, the receiver controller 42, and in one embodiment, the receivers 43a, 43b, 43c, . . . 43m. The receiver controller 42 communicates with the receivers 43a, 43b, 43c, . . . 43m. The receivers 43a, 43b, 43c, . . . 43m communicate with the signal constructor controller 60.

The quantity of n transmitters 33 may be equal to the quantity of m receivers 43 in one embodiment. Alternatively, the quantity of n transmitters 33 may be less than the quantity of m receivers 43, or the quantity of n transmitters 33 may be greater than the quantity of m receivers 43.

The transmitter controller 32 commands timing and control of the transmitters 33a, 33b, 33c, . . . 33n to generate and transmit radar signals. The receiver controller 42 interacts with the receivers 43a, 43b, 43c, . . . 43m to receive and record a reflected radar signal, i.e., an echo signal. The signal constructor controller 60 effects image formation and analysis based upon the radar signal reception and recorded data. It also employs a matched filter to permit the received signals to be individually discernible over the series of the NLFM radar signals.

A calibration circuit 50 is interposed between the phased array antenna 25, the transmitter array 30, and the receiver array 40. Additional details of the calibration circuit 50, the phased array antenna 25, the transmitter array 30, and the receiver array 40 are described with reference to FIGS. 3 and 4. Operation of the calibration circuit 50 to dynamically calibrate the radar system 20 is controlled by the signal constructor controller 60 via a radar calibration process 65. The signal constructor controller 60, transmitter controller 32, receiver controller 42, and the calibration circuit 50 communicate via a communication bus or wirelessly.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/ output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium.

Figure 2:
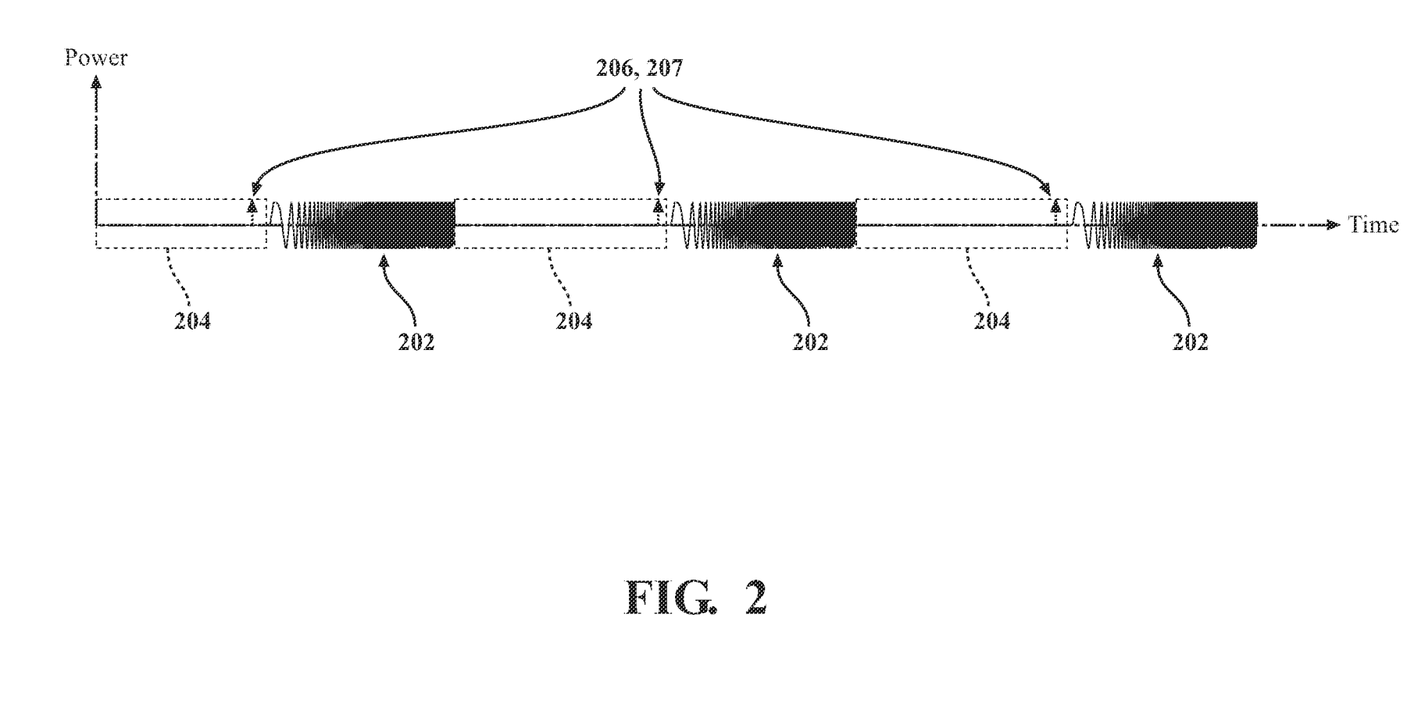
FIG. 2 graphically illustrates a plurality of transmitted radar signal and intervening quiet periods that include pilot signals, with radar power indicated on the vertical axis and time indicated on the horizontal axis, in accordance with the disclosure.

FIG. 2 graphically illustrates, with continued reference to the radar system 20 of FIG. 1, a plurality of radar periods 202 and intervening quiet (no power) periods 204, with radar power indicated on the vertical axis and time indicated on the horizontal axis. During each of the radar periods 202, radar signals are generated and transmitted. In one embodiment, the transmitted radar signals are frequency-modulated continuous wave (FMCW) radar pulses. During at least a portion of the quiet periods 204, a calibration event 206 occurs, during which a pilot signal 207 is generated. In one embodiment, the pilot signal 207 is a radiofrequency (RF) signal that is a short-term continuous sine wave (CW). In one embodiment, the pilot signal 207 may occur at the end of the quiet period 204.

Referring again to FIG. 1, the transmitter controller 32 commands timing and control of the transmitters 33a, 33b, 33c, . . . 33n to generate and transmit radar signals, i.e., the plurality of transmitted radar signals 203. In one embodiment, the signal constructor controller 60 monitors the plurality of transmitted radar signals 203, and commands operation of the transmitter controller 32 and elements of the calibration circuit 50 to execute the radar calibration process 65 during the quiet periods 204.

As described herein, the radar calibration process 65 includes one or a plurality of algorithms that are executed in or through the signal constructor controller 60 to control elements of the calibration circuit 50 and the radar system 20 to dynamically calibrate the radar system 20 during ongoing operation thereof. The radar calibration process 65 includes employing the transmitter(s) during a portion of each of the quiet periods 204 to transmit a pilot signal. The pilot signal is injected, simultaneously, using a power divider, to all the receive channels of the antenna array. The injection of the pilot signal into each of the channels is accomplished using a directional coupler. The pilot signal may undergo different delays and attenuations in the plurality of receive channels of the antenna array due to imbalances in the circuitry of the receive channels that may be caused by manufacturing variations, aging, temperature, etc. When the pilot signal 207 is a continuous sine wave (CW), a delay difference between the channels that is shorter than one cycle of the pilot signal 207 is manifested as a phase offset and a variation in signal gain. The phase offset can be estimated with respect to a reference channel, which is one of the receive channels. The calibration process includes introducing adjustments to gain and phase offset for each of the receive channels to eliminate the effect of the delays and attenuations between the channels, thus enabling coherent signal reception in the signal constructor controller 60 of the on-vehicle radar system 20 related to location and trajectory of vehicles, pedestrians and other objects proximal to the vehicle 10.

Figure 3:
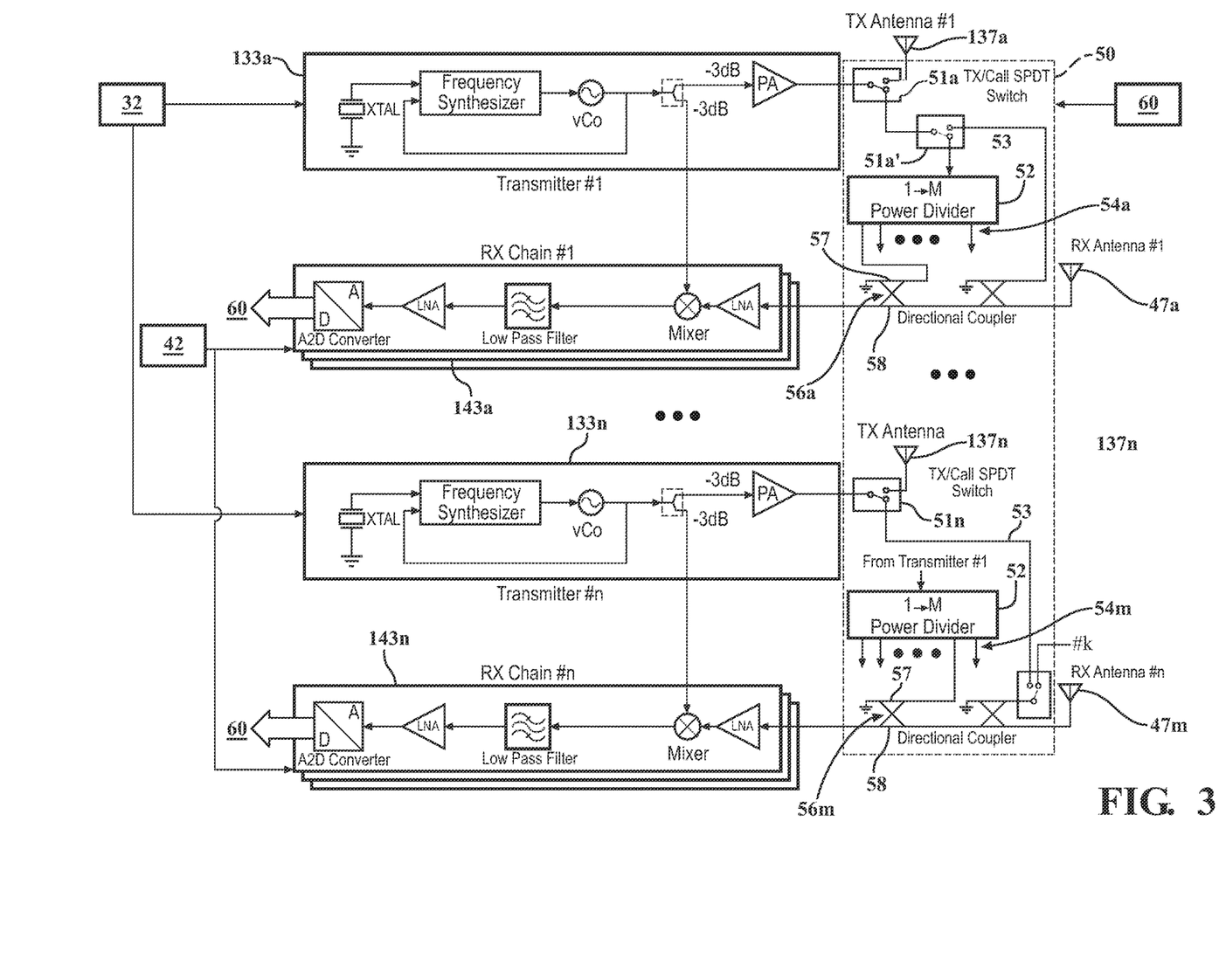
FIG. 3 schematically illustrates an embodiment of a radar system that includes a multiple input, multiple output (MIMO) antenna array, a plurality of transmitters, a plurality of receivers, and a calibration circuit, in accordance with the disclosure.

FIG. 3 schematically illustrates details of an embodiment of the radar system 20 described with reference to FIG. 1, including a MIMO antenna array, a plurality of transmitters, a plurality of receivers, and calibration circuit 50. The antenna array includes a plurality of transmit antennas 37a, . . . 37n, and a plurality of receiving antennas 47a, . . . 47m.

The plurality of transmitters includes a quantity of n transmitters that are designated by numerals 133a, . . . 133n. The plurality of n transmitters 133a, . . . 133n, communicate with the plurality of transmit antennas 37a, . . . 37n. Transmitter controller 32 controls the plurality of n transmitters 133a, . . . 133n. Transmitters 133a, . . . 133n are analogous to the transmitters 33a, . . . 33n that are described with reference to FIG. 1.

The plurality of receivers includes a quantity of m receivers designated by numerals 143a, . . . 143m. The plurality of receivers 143a, . . . 143m communicate with the plurality of receiving antennas 47a, . . . 47m. Receivers 143a, . . . 143m are analogous to the receivers 43a, . . . 43m that are described with reference to FIG. 1. The plurality of n transmitters 133a, . . . 133n are controlled by controller 42 in response to commands from the signal constructor controller 60 as part of the radar calibration process 65.

The receivers 143a, . . . 143m also communicate with the signal constructor controller 60.

The quantity of n transmitters 133 may be equal to the quantity of m receivers 143 in one embodiment. Alternatively, the quantity of n transmitters 133 may be less than the quantity of m receivers 143, or the quantity of n transmitters 133 may be greater than the quantity of m receivers 143.

Transmitter controller 32 commands timing and control of the transmitters 33a, 33b, 33c, . . . 33n to generate and transmit radar signals. A receiver controller 42 interacts with the receivers 43a, 43b, 43c, . . . 43m to receive and record a reflected radar signal, i.e., an echo signal. The signal constructor controller 60 effects image formation and analysis based upon the radar signal reception and recorded data. It also employs a matched filter to permit the received signals to be individually discernible over the series of the NLFM radar signals.

Calibration circuit 50 includes a 1-to-m power divider 52, a plurality of directional couplers 56a, . . . , 56m, and a plurality of controllable single-pole, double-throw (SPDT) switches 51a, . . . 51n, all of which are controlled in response to commands from the signal constructor controller 60.

The power divider 52 transfers the pilot signal from transmitter 133a via input line 53 and the power divider 52 to the plurality of output lines.

Each of the directional couplers 56a, . . . 56m is fabricated as first and second transmission links 57, 58, respectively, that are arranged in parallel. Directional couplers are fabricated from two coupled transmission lines that are set close enough together such that energy passing through one is coupled to the other.

Directional coupler 56a is fabricated with the first transmission link 57 being coupled to output line 54a of the power divider 52, and the second transmission link 58 being an input line between the first receive antenna 47a and the first receiver 143a. The other directional couplers 56b, . . . 56m are similarly fabricated using the respective output line 54b, . . . 54m of the power divider 52 and the input line between the respective receive antenna 47b, . . . 47m and the respective receiver 143b, . . . 43m.

When employed in this manner, the directional couplers 56a, . . . 56m simultaneously inject the pilot signal into the signals captured by the receive antennas 47a, . . . 47m and processed by the plurality of receivers 143a, . . . 143m.

Switches 51a, 51a', . . . 51n are installed between one of the transmitters 133a, . . . 133n, and the corresponding transmit antenna 137a, . . . 137n. This includes switches 51a, 51a' that are installed between the first transmitter 133a and the first transmit antenna 137a.

When operating during the radar periods, the transmitters 133a, . . . 133n generate radar signals, and the respective switches 51a, . . . 51n are controlled to a first state to transfer the radar signals from the respective transmitter 133a, . . . 133n to the respective transmit antenna 137a, . . . 137n.

During the quiet periods described with reference to FIG. 2, the first transmitter 133a generates the pilot signal, and switches 51a, 51a' associated with the first transmitter 133a are controlled to a second state (as shown) to transfer the pilot signal from transmitter 133a to the power divider 52 via input line 53. Switches 51b, 51n are also controlled to the second state to disable the respective transmit antenna 137b, . . . 137n.

Calibration of the receivers 143 includes selecting one of the transmitter channels, e.g., first transmitter 33a, as the reference channel, which generates the pilot signal. This signal is injected simultaneously to the m receive channels by setting the two switches 51a, 51a' of the reference channel into receiver calibration mode (e.g., as shown). The pilot signal is then injected simultaneously into all the M receive channels, and the phase, gain, frequency offsets can be measured digitally and be stored in memory.

Calibration of the transmitters 133 includes setting the two switches 51a, 51a" of the reference channel into receiver calibration mode such that the signal will not be fed into the power divider 52. The phase/gain/frequency offsets between the transmitters 133 may be measured digitally and applied to the transmit channels in the radar transmitters for correction. For calibrating the remaining K=(n-m) antennas, the second switch in the respective receiver channel is be set to enable the injection of the pilot signal from the kth transmit channel.

As described herein, the radar calibration process 65 includes employing the transmitter(s) during a portion of each of the quiet periods 204 to transmit a pilot signal 207. The pilot signal 207 is simultaneously injected to all the receive channels of the antenna array using the power divider 52. The injection of the pilot signal 207 into each of the channels is accomplished using the directional coupler 56. The pilot signal 207 may undergo different delays and attenuations in the plurality of receive channels of the antenna array due to imbalances in the circuitry of the receive channels that may be caused by manufacturing variations, aging, temperature, etc. When the pilot signal is a continuous sine wave (CW), a delay difference between the channels that is shorter than one cycle of the pilot signal is manifested as a phase offset and a variation in signal gain. The phase offset can be estimated with respect to a reference channel, which is one of the receive channels. The calibration process includes introducing adjustments to gain and phase offset for each of the receive channels to eliminate the effect of the delays and attenuations between the channels, thus enabling coherent signal reception in the signal constructor controller 60 of the on-vehicle radar system 20 related to location and trajectory of vehicles, pedestrians and other objects proximal to the vehicle 10.

Figure 4:
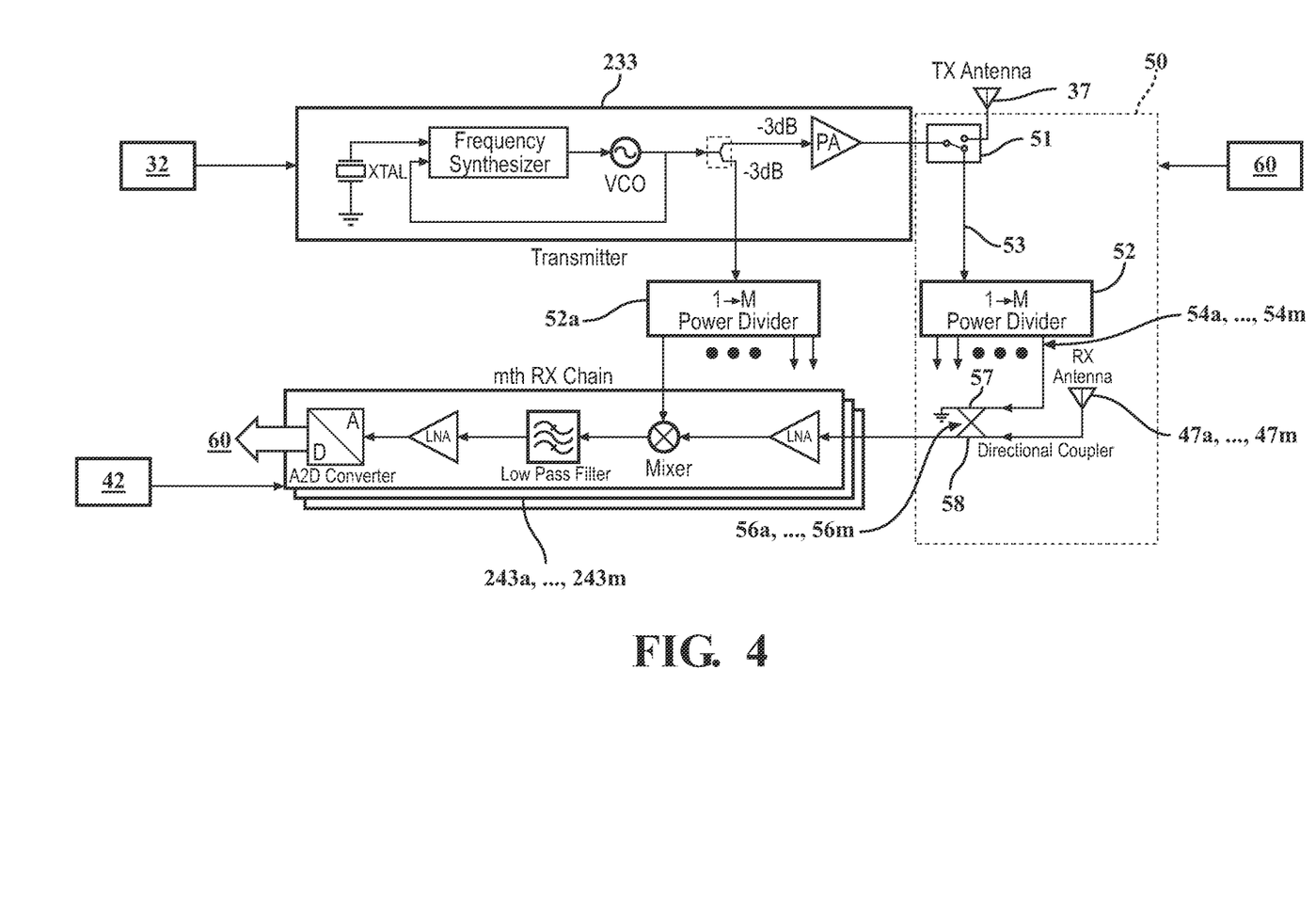
FIG. 4 schematically illustrates an embodiment of a radar system that includes a single-input, multiple output (SIMO) antenna array, a single transmitter, a plurality of receivers, and a calibration circuit, in accordance with the disclosure.

FIG. 4 schematically illustrates details of an embodiment of the radar system 20 described with reference to FIG. 1, including a single-input, multiple output (SIMO) antenna array, a single transmitter, a plurality of receivers, and calibration circuit 50.

The antenna array includes transmit antenna 37 and a plurality of receiving antennas 47a, . . . 47m. Transmitter 233 communicates with the transmit antenna 37. Transmitter controller 32 controls the transmitter 233. Transmitter 133 is analogous to the transmitters 33a, . . . 33n that are described with reference to FIG. 1.

The plurality of receivers includes a quantity of m receivers designated by numerals 243a, . . . , 243m. The plurality of receivers 243a, . . . , 243m communicate with the plurality of receiving antennas 47a, . . . , 47m. Receivers 243a, . . . , 243m are analogous to the receivers 43a, . . . 43m that are described with reference to FIG. 1.

The transmitter 233 is controlled by transmitter controller 32 in response to commands from the signal constructor controller 60 as part of the radar calibration process 65. The receivers 243a, . . . , 243m communicate with the signal constructor controller 60. Transmitter controller 32 commands timing and control of the transmitter 33 to generate and transmit radar signals. A receiver controller 42 interacts with the receivers 243a, . . . , 243m to receive and record a reflected radar signal, i.e., an echo signal. The signal constructor controller 60 effects image formation and analysis based upon the radar signal reception and recorded data. It also employs a matched filter to permit the received signals to be individually discernible over the series of the NLFM radar signals.

Calibration circuit 50 includes a 1-to-m power divider 52, a plurality of directional couplers 56a, . . . , 56m, and a controllable single-pole, double-throw (SPDT) switch 51, which is controlled in response to commands from the signal constructor controller 60 that are generated by the radar calibration process 65. The power divider 52 divides power from input line 53 to a plurality of output lines 54a, . . . 54m.

Each of the directional couplers 56a, . . . 56m is fabricated as first and second transmission links 57, 58, respectively, that are arranged in parallel. Directional coupler 56a is fabricated with the first transmission link 57 being coupled to output line 54a of the power divider 52, and the second transmission link 58 being an input line between the first receive antenna 47a and the first receiver 243a. The other directional couplers 56b, . . . , 56m are similarly fabricated using the respective output line 54b, 54m of the power divider 52 and the input line between the respective receive antenna 47b, 47m and the respective receiver 243b, 243m.

When employed in this manner, the directional couplers 56a, . . . , 56m simultaneously inject the pilot signal into the signals captured by the receive antennas 47a, . . . 47m and processed by the plurality of receivers 243a, . . . , 243m.

Switch 51 is installed between the transmitter 233 and the transmit antenna 237. When operating in the radar mode, the transmitter 233 generates radar signals, and the switch 51 is controlled to a first state to transfer the radar signals from the transmitter 233 to the transmit antenna 237. When operating in the calibration mode, the transmitter 233 generates the pilot signal 207, and switch 51 is controlled to a second state (as shown) to transfer the signal from transmitter 233 to the power divider 52 via input line 53.

The teachings may be described herein in terms of functional and/or logical block components and/or various processing steps. Such block components may be composed of hardware, software, and/or firmware components that have been configured to perform the specified functions. Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A radar calibration system for calibrating a radar system, the system comprising:
   the radar system including a phased array antenna including a first antenna array and a second antenna array, a transmitter array, and a receiver array, a plurality of communication leads, a calibration circuit, and a controller;
   wherein the transmitter array is in communication with the first antenna array;
   wherein the receiver array is in communication with the second antenna array;
   wherein the receiver array includes a plurality of receivers;
   wherein the second antenna array includes a plurality of receive antennas;
   wherein the plurality of receive antennas communicates with the plurality of receivers via the plurality of communication leads;
   the calibration circuit including a power divider and a plurality of directional couplers, wherein each of the plurality of directional couplers includes a first transmission link arranged proximal to a second transmission link; and the power divider includes an input lead and a plurality of output leads;
   wherein the input lead is connectable to an output of one of a plurality of transmitters of the transmitter array;
   wherein one of the plurality of output leads of the power divider is connected to the first transmission link of the directional coupler; and
   wherein each of the second transmission links of the plurality of directional couplers is connected in series between one of the plurality of receive antennas and one of the receivers of the receiver array; and
   the controller arranged to communicate with the transmitter array, the receiver array, and the calibration circuit, the controller including an instruction set, the instruction set executable to:
   inject, via the power divider and the plurality of directional couplers, a pilot signal to the plurality of receivers during a quiet period;
   designate one of the plurality of receivers as a reference channel;
   determine a plurality of phase offsets and a plurality of gain imbalances for the plurality of receivers in relation to the reference channel based upon the pilot signal;
   determine a plurality of phase calibrations and a plurality of gain calibrations for the plurality of receivers based upon the plurality of phase offsets and the plurality of gain imbalances;
   determine a radar-related parameter based upon the plurality of phase calibrations and the plurality of gain calibrations for the plurality of receivers; and
   control operation of the radar system based upon the radar-related parameter.

2. The system of claim 1, wherein the transmitter array is composed of a plurality of transmitters, and the first antenna array is composed as a multiple-input, multiple output (MIMO) antenna array.

3. The system of claim 1, wherein the transmitter array is composed of a single transmitter, and the first antenna array is composed as a single-input, multiple output (SIMO) antenna array.

4. The system of claim 1, wherein the pilot signal comprises a radiofrequency (RF) signal having a continuous sine wave.

5. The system of claim 1, wherein the instruction set being executable to inject, via the power divider and the plurality of directional couplers, the pilot signal to the plurality of receivers during the quiet period comprises the instruction set being executable to inject the pilot signal between consecutive radar signals generated by the transmitter array.

6. The system of claim 1, wherein the radar system is configured as a frequency-modulated continuous-wave radar (FM-CW) system.

7. The system of claim 1, wherein the system to calibrate the radar system is arranged on a vehicle.

8. The system of claim 1, wherein the instruction set being executable to determine a radar-related parameter including a direction of arrival, time delay, and doppler shift based upon the plurality of phase calibrations and the plurality of gain calibrations for the plurality of receivers comprises the instruction set being executable to determine one of a phase offset and a gain imbalance for each of the plurality of receivers.

9. A method for calibrating a radar system, the method comprising:
   injecting, via a calibration circuit including a power divider and a plurality of directional couplers, a pilot signal to a plurality of receivers during a quiet period;
   designating one of the plurality of receivers as a reference channel;
   determining a plurality of phase offsets and a plurality of gain imbalances for the plurality of receivers in relation to the reference channel based upon the pilot signal;
   determining a plurality of phase calibrations and a plurality of gain calibrations for the plurality of receivers based upon the plurality of phase offsets and the plurality of gain imbalances;

determining a radar-related parameter based upon the plurality of phase calibrations and the plurality of gain calibrations for the plurality of receivers; and controlling operation of the radar system based upon the radar-related parameter;

wherein one of the plurality of directional couplers includes a first transmission link arranged proximal to a second transmission link; and the power divider includes an input lead and a plurality of output leads;

wherein the input lead is connectable to an output of one of a plurality of transmitters of the transmitter array;

wherein each of the plurality of output leads of the power divider is connected to the first transmission link of the directional coupler; and wherein each of the second transmission links of the plurality of directional couplers is connected in series between one of the plurality of receive antennas and one of the receivers of the receiver array.

10. The method of claim 9, wherein injecting the pilot signal comprises injecting a radiofrequency (RF) signal having a continuous sine wave.

11. The method of claim 9, wherein injecting, via the power divider and the plurality of directional couplers, the pilot signal to the plurality of receivers during the quiet period comprises injecting the pilot signal between consecutive radar signals generated by a transmitter array.

12. The method of claim 9, determining a radar-related parameter including one of a direction of arrival, time delay, doppler shift based upon the plurality of phase calibrations and the plurality of gain calibrations for the plurality of receivers comprises determining one of a phase offset and a gain imbalance for each of the plurality of receivers.

13. A vehicle, comprising:
a radar system, a radar calibration system, and an advanced driving assistance system (ADAS) configured to provide autonomous vehicle control;
wherein the radar system includes a phased array antenna including a first antenna array and a second antenna array, a transmitter array, and a receiver array, a plurality of communication leads, a calibration circuit, and a controller;
wherein the transmitter array is in communication with the first antenna array;
wherein the receiver array is in communication with the second antenna array;
wherein the receiver array includes a plurality of receivers;
wherein the second antenna array includes a plurality of receive antennas;
wherein the plurality of receive antennas communicates with the plurality of receivers via the plurality of communication leads;
the calibration circuit including a power divider and a plurality of directional couplers, wherein one of the plurality of directional couplers includes a first transmission link arranged proximal to a second transmission link; and the power divider includes an input lead and a plurality of output leads;
wherein the input lead is connectable to an output of one of a plurality of transmitters of the transmitter array;
wherein each of the plurality of output leads of the power divider is connected to the first transmission link of the directional coupler; and
wherein each of the second transmission links of the plurality of directional couplers is connected in series between one of the plurality of receive antennas and one of the receivers of the receiver array; and
wherein the radar calibration system includes a controller arranged to communication with the transmitter array, the receiver array, and the calibration circuit, the controller including an instruction set, the instruction set executable to:
inject, via the power divider and the plurality of directional couplers, a pilot signal to the plurality of receivers during a quiet period;
designate one of the plurality of receivers as a reference channel;
determine a plurality of phase offsets and a plurality of gain imbalances for the plurality of receivers in relation to the reference channel based upon the pilot signal;
determine a plurality of phase calibrations and a plurality of gain calibrations for the plurality of receivers based upon the plurality of phase offsets and the plurality of gain imbalances;
determine a radar-related parameter based upon the plurality of phase calibrations and the plurality of gain calibrations for the plurality of receivers; and
control operation of the radar system based upon the radar-related parameter.

14. The vehicle of claim 13, wherein the pilot signal comprises a radiofrequency (RF) signal having a continuous sine wave.

15. The vehicle of claim 13, wherein the instruction set being executable to inject, via the power divider and the plurality of directional couplers, the pilot signal to the plurality of receivers during the quiet period comprises the instruction set being executable to inject the pilot signal between consecutive radar signals generated by the transmitter array.

16. The vehicle of claim 13, wherein the radar system is configured as a frequency-modulated continuous-wave radar (FM-CW) system.

17. The vehicle of claim 13, wherein the ADAS is configured to provide autonomous vehicle control in response in the radar system that is calibrated via the calibration circuit.

18. The vehicle of claim 13, wherein the transmitter array is composed of a plurality of transmitters, and the first antenna array is composed as a multiple-input, multiple output (MIMO) antenna array.

19. The vehicle of claim 13, wherein the instruction set being executable to inject, via the power divider and the plurality of directional couplers, the pilot signal to the plurality of receivers during the quiet period comprises the instruction set being executable to inject the pilot signal between consecutive radar signals generated by the transmitter array.

20. The vehicle of claim 13, wherein the instruction set being executable to determine a radar-related parameter including a direction of arrival, time delay, and doppler shift based upon the plurality of phase calibrations and the plurality of gain calibrations for the plurality of receivers comprises the instruction set being executable to determine one of a phase offset and a gain imbalance for each of the plurality of receivers.

* * * * *